United States Patent
Fini et al.

(10) Patent No.: US 8,682,127 B2
(45) Date of Patent: Mar. 25, 2014

(54) MODULAR METHOD OF MAKING SINGLE MODE OPTICAL FIBERS

(71) Applicants: John M. Fini, Metuchen, NJ (US); Robert L. Lingle, Jr., Johns Creek, GA (US); Yi Sun, Suwanee, GA (US)

(72) Inventors: John M. Fini, Metuchen, NJ (US); Robert L. Lingle, Jr., Johns Creek, GA (US); Yi Sun, Suwanee, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 13/893,692

(22) Filed: May 14, 2013

(65) Prior Publication Data

US 2013/0243949 A1   Sep. 19, 2013

Related U.S. Application Data

(62) Division of application No. 12/924,471, filed on Sep. 28, 2010, now Pat. No. 8,472,770.

(51) Int. Cl.
*G02B 6/36* (2006.01)
*G02B 6/02* (2006.01)

(52) U.S. Cl.
USPC ............. 385/127; 385/28; 385/126; 385/144; 65/413; 65/415

(58) Field of Classification Search
USPC .............. 385/28, 123, 126, 127, 144; 65/385, 65/413–415
See application file for complete search history.

(56) References Cited

U.S. PATENT DOCUMENTS

| | | | |
|---|---|---|---|
| 4,852,968 A | 8/1989 | Reed | 350/96.33 |
| 5,053,068 A | 10/1991 | Kyoto et al. | 65/3.11 |
| 6,751,389 B2 * | 6/2004 | Tirloni | 385/127 |
| 6,952,518 B2 * | 10/2005 | Zhang et al. | 385/126 |
| 7,239,784 B2 * | 7/2007 | Hayami et al. | 385/123 |
| 7,356,233 B2 | 4/2008 | Fini | 385/126 |
| 8,107,784 B2 | 1/2012 | Borel et al. | 385/127 |
| 8,472,770 B2 * | 6/2013 | Fini et al. | 385/127 |
| 2003/0021533 A1 * | 1/2003 | Ishikawa et al. | 385/37 |
| 2007/0104437 A1 | 5/2007 | Bookbinder et al. | 385/125 |
| 2007/0280615 A1 | 12/2007 | de Montmorillon et al. | 385/127 |
| 2009/0060437 A1 | 3/2009 | Fini et al. | 385/127 |
| 2009/0290841 A1 | 11/2009 | Borel et al. | 385/127 |

FOREIGN PATENT DOCUMENTS

| | | | |
|---|---|---|---|
| EP | 1845399 | 10/2007 | G02B 6/036 |
| WO | 2005102946 | 11/2005 | C03B 37/012 |

OTHER PUBLICATIONS

IDS filed by Applicants in the parent U.S. Appl. No. 12/924,471.
In the parent U.S. Appl. No. 12/924,471.

(Continued)

*Primary Examiner* — Daniel Petkovsek
(74) *Attorney, Agent, or Firm* — Michael J. Urbano

(57) ABSTRACT

Described is a modular method of making an optical fiber comprising a core and a cladding configured to support and guide a fundamental transverse mode, the cladding including (i) an outer cladding having an index $n_{out}$ less than the index $n_1$ of the core, (ii) an inner cladding having an index $n_2 < n_{out}$, (iii) a pedestal having an index $n_4 \approx n_{out}$, (iv) an inner trench disposed between the inner cladding and the pedestal, the inner trench having an index $n_3 << n_4$, and (iv) an outer trench disposed between the pedestal and the outer cladding, the outer trench having an index $n_5 < n_4$ and relatively close to $n_{out}$. To suppress unwanted HOMs the pedestal is configured to resonantly couple at least one unwanted transverse mode of the core (other than the fundamental mode) to at least one transverse mode of the pedestal.

14 Claims, 8 Drawing Sheets

(56) References Cited

OTHER PUBLICATIONS

Fini, "Design of solid and microstructure fibers for suppression of higher-order modes," *Optics Express*, vol. 13, No. 9, pp. 3477-3490 (May 2005).

Fini et al., "Bend Insensitive . . . ," *Optical Fiber Communication Conferencs* (OFC), San Diego, CA (Mar. 22-26, 2009), paper OTuL4 (3 pages).

Fini et al., "Solid low-bend-loss . . . ," *34th European Conference on Optical Communication* (ECOC), Brussels, Belgium (Sep. 21-25, 2008), (2 pages).

Fini et al., "Solid ring-assisted . . . ," *Opto-Electronics and Communications Conference* (OECC), Sydney, Australia (Jul. 7-10, 2008), (2 pages).

MacChesney et al., "Overview of Materials and Fabrication Technologies," Ch. 3, pp. 69-94, Section. 3.4 "Vertical Axial Deposition," Section 3.7 "Plasma Chemical Vapor Deposition," and Section 3.8 "Sol-Gel Processes," *Specialty Fiber Handbook* (Mendezand et al. ed. 2007).

Refi, *Fiber Optic Cable—A Light Guide*, abc Teletraining Inc. (1991), pp. 67-68.

Fontaine, "Vapor Deposition," pp. 1-6, available on the internet on Oct. 29, 2009 at website URL www.cooper.edu/engineering/projects/gateway/ee/solidmas/modlec5/node.html.

Morrow et al., , "Outsids Vapor Deposition," in *Optical Fiber Communications*, vol. 1: *Fiber Fabrication*, Ch. 2, pp. 1-33, T. Li, ed. Academic Press, Inc. (Orlando, 1985).

Schotz et al., "New Silica Fiber for Broad-Band Spectroscopy," *Fiber Optics in Astronomy III, ASP Conference Series*, vol. 152, pp. 20-31 (1998).

Martincek et al., "The determination of the refractive index profile . . . ," *Optik*, vol. 115, No. 2, pp. 86-88 (2004).

\* cited by examiner

MODULAR METHOD OF MAKING SINGLE MODE OPTICAL FIBERS

CROSS-REFERENCE TO RELATED APPLICATION

This application is a division of parent application Ser. No. 12/924,471 filed on Sep. 28, 2010 now U.S. Pat. No. 8,472,770 issued on Jun. 25, 2013, which is a continuation-in-part of grandparent application Ser. No. 12/472,522 (now U.S. Pat. No. 8,107,784 issued on Jan. 31, 2012) filed on May 27, 2009, which is in turn a continuation-in-part of great-grandparent application Ser. No. 12/072,869 (now U.S. Pat. No. 8,374,472 issued on Feb. 12, 2013), filed on Feb. 28, 2008, which is in turn a continuation-in-part of great-great-grandparent application Ser. No. 11/818,780 filed Jun. 15, 2007. These applications are incorporated herein by reference.

BACKGROUND OF THE INVENTION

1. Field of the Invention

This invention relates to single mode optical fibers and, more particularly, to the design and fabrication of such fibers that are compliant with international standards regarding a variety of characteristics including bend loss, dispersion, mode-field diameter (MFD), and higher-order mode (HOM) suppression.

2. Discussion of the Related Art

In contrast with standard single mode optical fiber used, for example, in land line, undersea and metro systems, access fiber, which is typically located closer to the user, includes fiber-to the-home (FTTH), jumper cables, and FTTx fiber (e.g., fiber-to-the-curb, indoor wiring). Access fiber must not only interface in a low loss, reliable way with standard single mode fiber (SMF), which carries optical signals to the location being accessed (e.g., home, business, or other facility), but also must be relatively insensitive to the effects of bending, which is inherent in many of the access fiber applications.

Thus, in access fiber applications it is highly desirable to have fibers that combine low bend loss and good compatibility with existing infrastructure and standards—in particular G.657 requirements with respect to bend loss and concurrently G.652 requirements with respect to a variety of characteristics, such as dispersion, HOM cutoff and MFD.

However, there is an inherent difficulty in achieving low bend loss without sacrificing properties important to compatibility, especially mode size, splice or connector loss, cutoff, and HOM suppression.

Ring-assisted or resonance-assisted fiber (RAF) designs alleviate these difficulties, but many previous RAF designs suffer from fabrication constraints and a lack of compliance with both G.657 and G.652 concurrently (e.g., G.657.B3 and G.652.D). Fabrication constraints lead to higher cost and smaller preform size. In particular, the interior region (i.e., excluding the outer cladding) of a conventional RAF has a refractive index profile fabricated using conventional vapor deposition techniques (e.g., MCVD). The various portions of the interior region (e.g., core, trench, ring/pedestal) have different refractive indices, which can be adjusted by doping with, for example, fluorine or creating hollow voids to produce a depressed-index region, or germanium to produce a raised-index region. Due to the large radial extent (cross-sectional area or volume) of the interior-region of a conventional RAF compared to a conventional single mode fiber, a significant fraction of the fiber volume is deposited using the vapor-phase process. Since the deposition rate of such processes is relatively slow, this type of fiber material has relatively low throughput and hence relatively high cost.

Therefore, there is a need for a RAF design that allows at least a portion of the interior-region to be fabricated by a technique other than conventional, low-deposition-rate vapor deposition.

In addition to manufacturing cost, some known RAFs have sufficiently low bend loss to be G.657.B3 compliant but fail to satisfy one or more of the requirements of G.652.D (such as its dispersion requirements). Therefore, there is also a need for a RAF design that is compliant with both G.657.B3 and G.652.D concurrently.

BRIEF SUMMARY OF THE INVENTION

In accordance with one aspect of our invention, an optical fiber that concurrently satisfies G.657 and G.652 standards comprises a core region and a cladding region configured to support and guide the propagation of light in a fundamental transverse mode, the cladding region including (i) an outer cladding region having a refractive index $n_{out}$ less than the refractive index $n_1$ of the core region, (ii) an inner cladding region have a refractive index $n_2$ less than $n_{out}$, (iii) a pedestal (or ring) region having a refractive index $n_4$ approximately equal to $r_{out}$, (iv) an inner trench region disposed between the inner cladding region and the pedestal region, the inner trench region having a refractive index $n_3$ much less than that of the pedestal region, and (iv) an outer trench region disposed between the pedestal region and the outer cladding region, the outer trench region having a refractive index $n_5$ less than that of the pedestal region and relatively close to that of the outer cladding region.

In order to suppress unwanted HOMs the pedestal region is configured to resonantly couple at least one unwanted transverse mode of the core region (other than the fundamental mode) to at least one transverse mode of the pedestal region.

In a preferred embodiment, our fiber comprises a multiplicity of modules: an inner module (the core and inner cladding regions), a central module (the inner trench region) and an outer module (the pedestal, outer trench and outer cladding regions), which are configured so that the fiber has a set of optical performance characteristics that satisfy the aforementioned international standards; namely, bend loss, zero-dispersion wavelength, zero-dispersion-wavelength slope, cutoff and MFD. To this end, $r_1$, the radius of the core region and $r_2$, the outer radius of the inner cladding region; are preferably designed so that the ratio $r_2/r_1$ is in the range of approximately 2.0-3.5 (i.e., $r_2/r_1 \sim 2.2$-3.5). Since $r_2$ is also the inner radius of the inner trench region, this inequality also defines the location of the inner trench region relative to the core region. When the position of the inner trench region (hence the central module) satisfies the above inequality, then the problem of making design tradeoffs is significantly alleviated; that is, depending on the performance characteristic under consideration, particular modules have a primary impact on that performance characteristic, whereas other modules do not (i.e., as used herein, the phrase do not, means that the other modules have little or no significant impact). For example, the inner module is the primary control of MFD and dispersion; the central module is the primary control of bend loss, especially at small bend radii; and the outer module is the primary control of HOM suppression (loss and cutoff) by resonant coupling Importantly the control imparted by our design allows our fibers to be concurrently compliant with both G.657.B3 and G.652.D standards.

Fibers designed in accordance with our invention may advantageously be used as access fiber, but may have other applications, such as fibers used in sensors or in vehicles.

In addition, fibers designed in accordance with our invention have improved manufacturability in that the various regions may be produced using various techniques other than low-deposition-rate techniques such as MCVD.

Thus, another aspect of our invention is a method of making the above-described optical fiber of silica glass comprising the steps of:

1) fabricating the inner module by a technique selected from the group consisting of vapor-phase axial deposition (VAD), outside vapor deposition (OVD), and plasma-assisted chemical vapor deposition (PCVD) of doped silica glass;
2) fabricating the central module of low index silica glass by a technique selected from the group consisting of plasma outside deposition (POD), PCVD, high-pressure sintering of deposited soot, a down-doped sol-gel tube overcladding process, and a void-filled glass process; and
3) fabricating the outer module of silica glass by a process that includes collapsing silica tubes—e.g., a down-doped silica tube for the outer trench region and an undoped silica tube for the outer cladding region.

BRIEF DESCRIPTION OF THE SEVERAL VIEWS OF THE DRAWING

Our invention, together with its various features and advantages, can be readily understood from the following more detailed description taken in conjunction with the accompanying drawing, in which:

FIG. 5 demonstrates that HOM loss is relatively independent of parameters $r_2$, $r_3$ and $n_3$;

FIG. 6 demonstrates that MFD is controlled by parameters $n_1$, $r_1$ and $n_2$, but is relatively independent of parameters $r_2$, $r_3$, $r_4$, $r_5$, $n_3$ and $n_5$;

FIG. 7 also demonstrates that MFD is controlled by parameters $n_1$, $r_1$ and $n_2$, but is relatively independent of parameters $r_2$, $r_3$, $r_4$, $r_5$, $n_3$ and $n_5$.

Figure 1A:
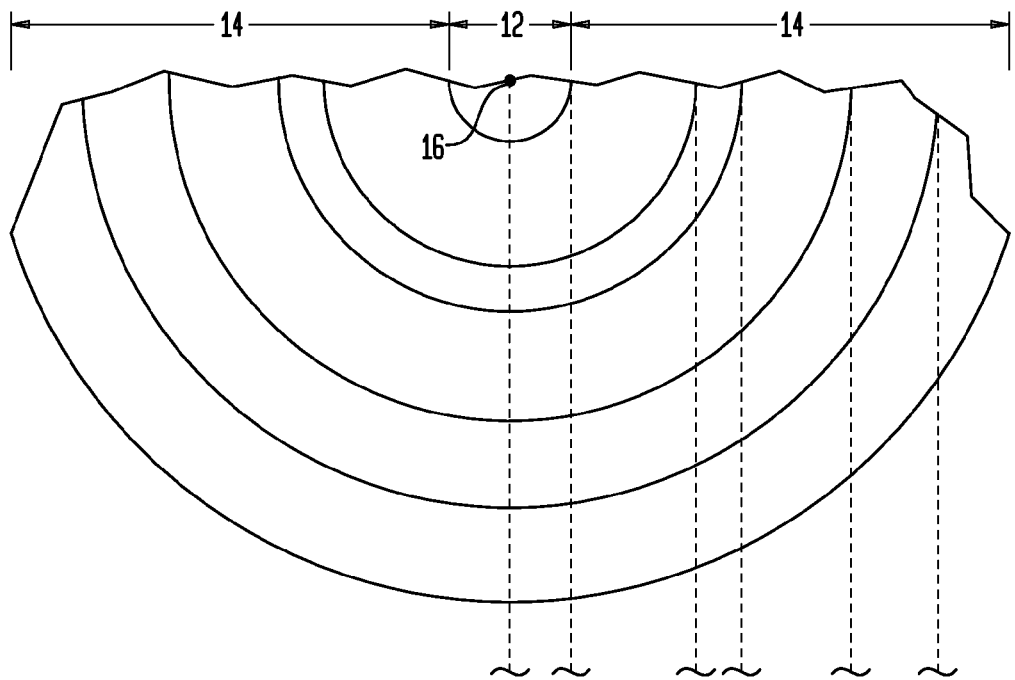
FIG. 1A is a schematic, cross-sectional view of a RAF in accordance with one embodiment of our invention.

Various ones of the foregoing figures are shown schematically in that they are not drawn to scale and/or, in the interests of simplicity and clarity of illustration, do not include all of the details of an actual optical fiber or product depicted.

GLOSSARY

Bending: Macro-bending, commonly referred to as simply bending, takes place when a fiber is bent or curled so that its curvature is relatively constant along its length. In contrast, micro-bending takes place when curvature changes significantly within the adiabatic length scale for a particular fiber (e.g., along fiber lengths on the order of a millimeter or less). Such micro-bends are formed, for example, in standard micro-bending tests by pressing the fiber into sand paper.

Center Wavelength: Throughout this discussion references made to wavelength are intended to mean the center wavelength of a particular light emission, it being understood that all such emissions have a characteristic linewidth that includes a well-known range of wavelengths above and below the center wavelength.

Glass Fiber: Optical fiber of the type described herein is typically made of glass (e.g., silica) in which the refractive indices of the core region and of the cladding region are controlled by the amount and type of one or more dopants (e.g., P, Al, Ge, F) or by hollow voids incorporated therein during the fabrication of the fiber, as is well known in the art. These refractive indices, as well as the thicknesses/diameters of core/cladding regions, determine important operating parameters, as is well known in the art.

Index: The terms index and indices shall mean refractive index and refractive indices. In designs where a particular region (e.g., a cladding region) includes microstructure [e.g., holes, whether filled (e.g., with a low-index gas, liquid or solid) or unfilled (e.g., air-holes)], then the index of such a region is interpreted to mean the average index seen by light propagating in that region.

Index Profile: The schematic index profile of FIG. 1B is an average of the actual variations of index that would be observable in an optical fiber. In addition, although various regions of the profile are shown as being rectangular, the boundaries of such regions need not be horizontal or vertical; one or more may be slanted, for example, the region may be trapezoidal.

Mode: The term mode(s) shall mean the transverse mode(s) of an electromagnetic wave (e.g., signal light).

Mode size: The size of an optical mode is characterized by its effective area $A_{\it{eff}}$, which is given by:

$$A_{\it{eff}} = \frac{\left(\int |E|^2 dA\right)^2}{\int |E|^4 dA}$$

where E is the transverse spatial envelope of the mode's electric field, and the integrations are understood to be performed over the cross-sectional area of the fiber. When the mode-field shape is close to an axisymmetric (i.e., symmetric about the longitudinal axis of rotation of the fiber) Gaussian function, the mode-field diameter (MFD) is an appropriate metric for the diameter of the mode and may be expressed as:

$$MFD = 2\sqrt{\frac{2\int |E|^2 dA}{\int \left|\frac{dE}{dr}\right|^2 dA}}$$

where r is the radial coordinate. When the mode-field shape is exactly equal to an axisymmetric Gaussian function, then $A_{eff} = \pi \times MFD^2/4$.

Radius/Diameter: Although the use of the terms radius and diameter in the foregoing (and following) discussion implies that the cross-sections of the various regions (e.g., core, pedestal, trench, cladding) are circular and/or annular, in practice these regions may be non-circular; for example, they may be elliptical, polygonal, irregular or other more complex shapes. Nevertheless, as is common in the art, we frequently use the terms radius and/or diameter for simplicity and clarity.

Resonant Coupling: By the terms resonant or resonantly coupled we mean that the effective refractive index ($n_{eff}$) of an unwanted mode (e.g., a HOM) in the core region is essentially equal to that of a mode in the pedestal region. As explained more fully in the description that follows, this phenomenon is used to suppress unwanted HOMs in RAF fibers designed in accordance with various embodiments of our invention.

Signal Propagation: Although signal light may actually crisscross the longitudinal axis as it propagates along a fiber, it is well understood in the art that the general direction of propagation is fairly stated as being along that axis (e.g., axis 16 of FIG. 1A).

Single Mode: References made to light propagation in a single transverse mode are intended to include propagation in essentially a single mode; that is, in a practical sense perfect suppression of all other modes may not always be possible. However, single mode does imply that the intensity of such other modes is either small or insignificant for the intended application.

Suppressed HOM: The degree to which an HOM needs to be suppressed (or cut-off) depends on the particular application. Total or complete suppression is not demanded by many applications, which implies that the continued presence of a relatively low intensity HOM may be tolerable. In any event, suppressing HOMs improves system performance by, for example, reducing total insertion loss, lowering noise in the signal mode, and lowering microbend loss.

Undoped: The term undoped or unintentionally doped means that a region of a fiber, or a starting tube used to form such a region, contains a dopant not intentionally added to the region during fabrication, but the term does not exclude low levels of background doping that may be inherently incorporated during the fabrication process. Such background doping levels are low in that they have an insignificant effect on the refractive index of the undoped region.

DETAILED DESCRIPTION OF THE INVENTION

The design of optical access fibers for typical practical applications involves consideration of a number of interrelated requirements: (i) relatively low bend loss (i.e., low bend sensitivity) for a bend radius within a predetermined range (e.g., approximately 3-15 mm); (ii) suppression of HOMs (i.e., relatively low cutoff wavelength for the HOM(s) to be suppressed); (iii) mode-area matching to standard SMF (e.g., good connectorization and/or splicing to standard fiber, such as SMF 28 commercially available from Corning Incorporated), and (iv) dispersion (e.g., zero-dispersion-wavelength slope and zero-dispersion wavelength). We describe below RAFs that address these requirements in the context of the International Telecommunication Union (ITU) standards with specifications referenced as ITU-T G.652 and G.657.

RAF Design—General Considerations

Figure 1B:
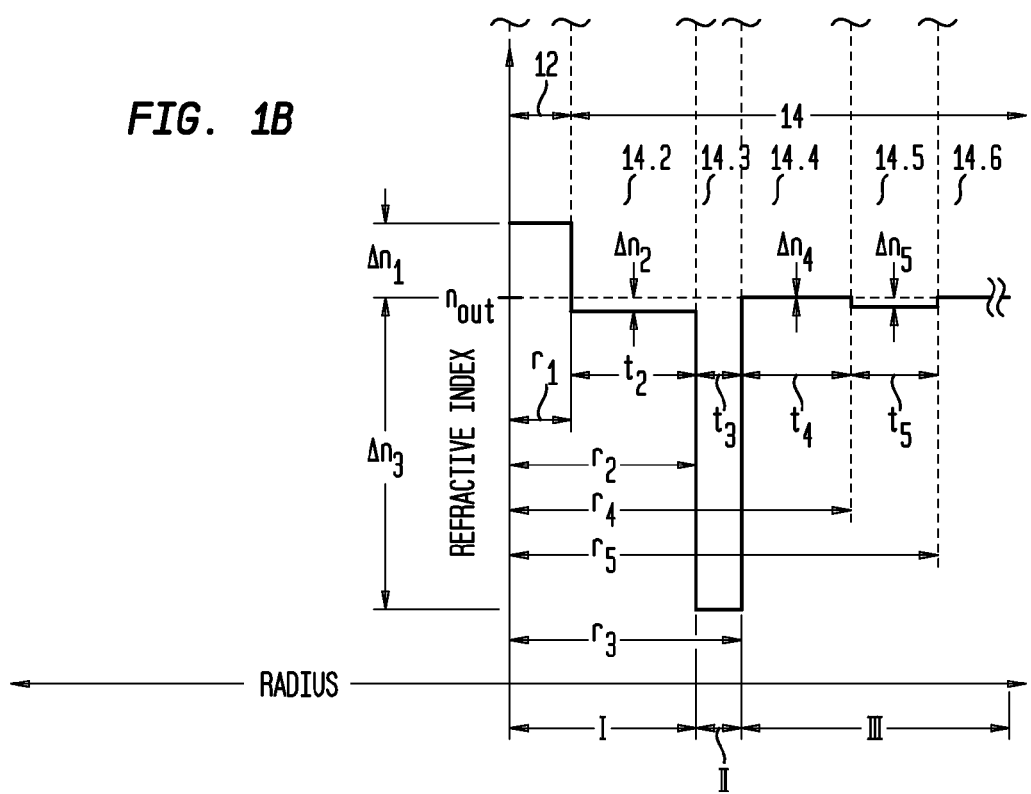
FIG. 1B is a schematic graph of an illustrative refractive index profile of the fiber of FIG. 1A.

With reference now to FIGS. 1A and 1B, an optical fiber 10 in accordance with an illustrative embodiment of our invention is suitable for a variety of access or sensor fiber applications. Fiber 10 includes a core region 12 of radius $r_1$ surrounded by a cladding region 14, with the core and cladding regions being configured to support and guide the propagation of signal light (radiation) axially along a longitudinal axis 16 located at essentially the center of the core region 12.

Although core region 12 is depicted as having a single-layer profile (i.e., a profile with an essentially constant or uniform index), it could also have a multi-step or graded-index profile.

In accordance with one embodiment of fiber 10, the cladding region 14 includes an annular outer cladding region 14.6 (inside radius $r_5$), an annular pedestal region 14.4 (outside radius $r_4$, inside radius $r_3$, thickness $t_4=r_4-r_3$), an annular, deep inner trench region 14.3 (outside radius $r_3$, inside radius $r_2$, thickness $t_3=r_3-r_2$) disposed between the core region 12 and the pedestal region 14.4, and an annular, shallow outer trench region 14.5 (outside radius $r_5$, inside radius $r_4$, thickness $t_5=r_5-r_4$) disposed between the pedestal region 14.4 and the outer cladding region 14.6.

Other layers (not shown; e.g., glass or polymer coatings) may surround the outer cladding region 14.6, as is well known in the art, for protection, strength, ease of handling, or other purposes, but do not affect the optical properties of the fiber.

The refractive index profile of FIG. 1B depicts the index of each of the various fiber regions relative to that of the outer cladding region 14.6; that is, the relative index ($\Delta n_i$) of the $i^{th}$ region is given by ($n_i - n_{out}$). Thus, the index of the outer cladding region ($n_{out}$) is less than that of the core region ($n_1$), and the index ($n_2$) of the inner cladding region 14.2 is less than that of the outer cladding region. The index ($n_4$) of the pedestal region 14.1 is approximately equal to the index of the outer cladding region 14.4, but the index ($n_5$) of the shallow outer trench region is slightly less than that of the outer cladding region. In addition, the refractive indices $n_3$, $n_5$ of both the inner and outer trench regions are lower than that of the pedestal region 14.4. As discussed below, the fiber 10 in general, and the pedestal region 14.4 in particular, is configured to suppress preselected (unwanted) HOMs of the core region 12.

RAF Design—HOM Considerations

In order to suppress HOMs in our RAF, the pedestal region 14.4 is configured so that at least one of its (ring) modes resonantly couples with at least one unwanted HOM (illustratively an $LP_{11}$ mode) of the core region 12. In this regard, the unwanted HOM of the core region 12 is made to be resonant with a ring mode of the pedestal region 14.4, whereas the fundamental mode of the core region is not resonant with any mode of the pedestal region. The particular ring mode typically has the highest or nearly the highest effective index, and it is not forbidden by well-known symmetry principles from coupling to the unwanted HOM of the core region.

By the terms resonant or resonantly coupled we mean that the effective refractive index ($n_{eff}$) of an unwanted HOM in the core region is essentially equal to that of a particular ring mode in the pedestal region, which allows energy in the unwanted HOM to transfer or couple from the core region into a particular ring mode of the pedestal region and from there to radiate into the outer cladding region 14.6. (Such radiation typically occurs via leaky cladding modes, which are usually present. Alternatively, this energy may be lost due to absorption, scattering, etc.) After a suitable propagation distance along the fiber, this process of resonant transfer and radiation effectively suppresses the unwanted HOM in the core region. In contrast, $n_{eff}$ of the fundamental mode of the core region does not correspond to the $n_{eff}$ of any mode in the pedestal region. Consequently, the fundamental mode propagates effectively in the core region, and no resonant transfer of its energy into the pedestal region takes place.

The condition that a core region HOM and a pedestal region ring mode have essentially equal effective refractive indices means, for example, that the core region HOM index and the particular pedestal region ring mode index are not so different that coupling of light between these modes is significantly frustrated. In a preferred embodiment of the invention, the difference between indices is much less than the difference between the core region fundamental mode index and the particular pedestal ring mode index.

Proper coupling between a core region HOM to be suppressed (i.e., the unwanted mode) and the resonant pedestal region mode should also take into account the need to reduce coupling of the latter pedestal mode back into the former core mode.

The fiber 10 should also be configured to allow effective leakage of unwanted core HOMs through the pedestal ring modes.

In addition, the coupling between the core region and the pedestal region should not be so large that the desired (fundamental) core mode is disrupted. On the other hand, the coupling between the core region and the pedestal region should not be too small that unwanted core HOMs will not couple sufficiently to pedestal ring modes to be suppressed. Next, the leakage rate of the pedestal ring mode should not be so large that coupling between the core and pedestal region is frustrated (i.e., insufficient). Finally, the leakage rate of the pedestal ring mode should not be so small that unwanted core HOMs will experience too little loss to be effectively suppressed.

Adherence to these design principles assures that in the core region 12, for example, the fundamental mode is effectively propagated, whereas the unwanted HOM is effectively suppressed. The degree to which the unwanted HOM needs to be suppressed (or cut-off) depends on the particular application. Total or complete suppression is not demanded by many applications, which implies that the continued presence of a relatively low intensity HOM may be tolerable. In any event, suppressing HOMs improves system performance by, for example, reducing total insertion loss, lowering noise in the signal mode, and/or lowering microbend loss.

Thus, resonant coupling enables our RAFs to operate in a single mode; e.g., in the fundamental mode of the core region.

Figure 4:
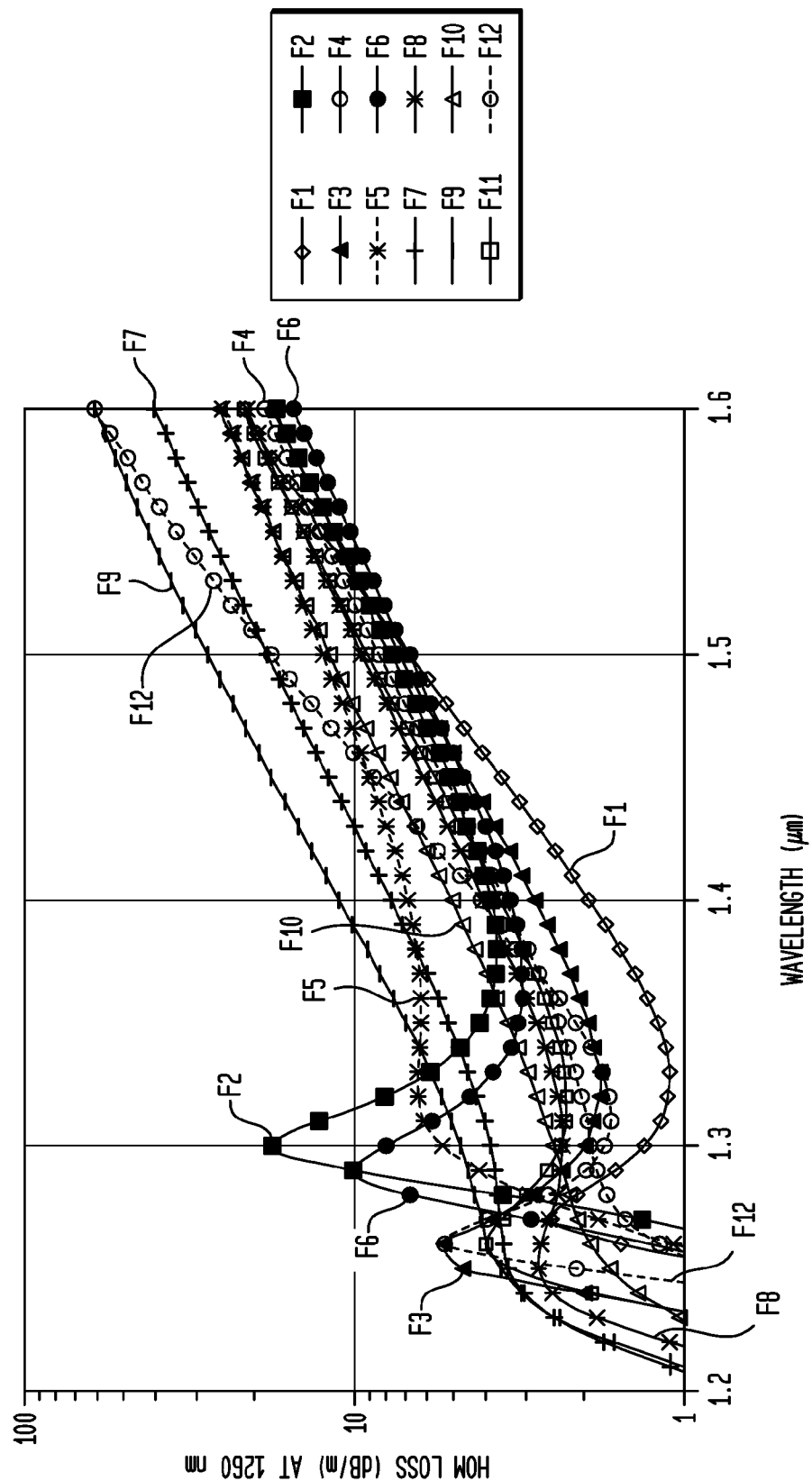
FIG. 4 is a graph of calculated HOM loss vs. wavelength showing a family of curves, one for each of a multiplicity of different fiber designs (F1-F12) of the type depicted in FIG. 1.

When our RAF is properly designed to effect index matching (or resonance) between unwanted HOM core modes and particular ring modes, then the slope of core mode and ring mode index curves (vs. wavelength) would be nearly the same, especially in the region where they intersect. Consequently, index-matched coupling between the core and ring modes is expected over a relatively wide wavelength range (i.e. broadband). In fact, the HOM loss curves (FIG. 4) discussed infra clearly indicate broadband suppression of HOMs.

The effect of bending is to increase $n_{eff}$ of the particular ring mode of the pedestal region 14.4 that is supposed to be resonant with the unwanted HOM of the core region. If the bend radius is sufficiently small, the particular ring mode may become resonant with the fundamental mode of the core region 12. Such resonance would disadvantageously and dramatically increase the optical loss of the fundamental core mode (also known as catastrophic bend loss). Accordingly, the pedestal region 14.4 needs to be configured to accommodate the bend radius expected in a particular application without causing the fundamental core mode to be resonant with any ring mode.

The foregoing principles of resonant coupling (index matching) may also be applied to the suppression of multiple unwanted core modes either by resonantly coupling them to a single, ring mode of a pedestal region or by resonantly coupling them to different ring modes of one or more pedestal regions, each core mode being resonant with a separate pedestal ring mode.

RAFs—Design Considerations

In this section we describe twelve designs (F1-F12) of the RAF of FIG. 1 in accordance with illustrative embodiments of our invention: For silica-based fibers, Table I below shows the relative refractive index for the individual regions of each embodiment, and Table II shows the corresponding radial dimensions of those regions.

In a later section we discuss simulations of the performance of these embodiments, which indicate that each is concurrently compliant with G.652.D and G.657.B3 ITU standards. The tables also indicate the approximate suitable ranges of the refractive index and radial dimensions of the RAF regions that resulted in compliance; namely, the refractive index ranges are: $\Delta n_1 = 428$ to $498 \times 10^{-5}$ ($\sim 4.3$-$5.0 \times 10^{-3}$) for the core region 12, $\Delta n_2 = -40$ to $-180 \times 10^{-5}$ for the inner cladding region 14.2, $\Delta n_1 - \Delta n_2 \sim 4.9$-$6.5 \times 10^{-3}$, $\Delta n_3 = -930$ to $-1600 \times 10^{-5}$ for the deeper inner trench region 14.3, $\Delta n_4 = 0 \times 10^{-5}$ for the pedestal region 14.4, and $\Delta n_5 = -40$ to $-160 \times 10^{-5}$ for the shallower outer trench region 14.5. (Our invention is not limited to pedestal region designs in which $\Delta n_4 = 0$. This index may be slightly above or below that of the outer cladding region, but its absolute value depends not only on resonant coupling conditions but also on the fabrication technique used to make the pedestal. Thus, for example, if the pedestal is formed from a silica tube, a low cost technique discussed infra, then $\Delta n_4$ would depend on the index of such tubes as supplied by commercial vendors.) The corresponding ranges of the radial dimensions for compliance are: $r_1 = 3.9$ to $4.3$ μm for the radius of core region 12; $r_2 = 9.0$-$14.5$ μm for the outer radius of the annular inner cladding region 14.2, which is equal to the inner radius of the annular inner trench region 14.3; $r_3 = 14.2$-$18.7$ μm for the outside radius of the annular inner trench region 14.3, which is equal to the inside radius of the pedestal region 14.4; $r_4 = 21.0$-$29.7$ μm for the outside radius of the annular pedestal region 14.4, which is equal to the inside radius of the outer trench region 14.5, and $r_5 = 28.0$-$33.7$ μm for the outside radius of the annular outer trench region 14.5, which is equal to the inside radius of the annular outer cladding region 14.6. (Although not shown in the tables or figures, we have also simulated a compliant RAF identical to F2 except that $r_5 = 25.5$ μm.) The outside diameter of the annular outer cladding region 14.6 is not critical and is typically in the range of about 80-140 μm, with 125 μm being typical for many access fiber applications.

An important feature of one aspect of our invention is a modular RAF design comprising a multiplicity of modules: an inner module I (the core and inner cladding regions), a central module II (the inner trench region) and an outer module III (the pedestal, outer trench and outer cladding regions), which are configured so that the fiber has a set of optical performance characteristics that satisfy the aforementioned international standards; namely, bend loss, zero-dispersion wavelength, zero-dispersion-wavelength slope, cutoff and MFD. To this end, $r_1$ and $r_2$ are preferably designed so that the ratio $r_2/r_1$ is in the approximate range of 2.2-3.5; that is, $$r_2/r_1 \sim 2.2\text{-}3.5, \quad (1)$$

which corresponds to the data shown in the right-hand column of Table II. As stated earlier, controlling the ratio $r_2/r_1$ is equivalent to controlling the thickness $t_2$ of the inner cladding region 14.2 and hence the location of the inner trench region 14.3. When the position of the inner trench region (hence the central module II) satisfies the above inequality, then the problem of making design tradeoffs is significantly alleviated; that is, depending on the performance characteristic under consideration, particular modules have a primary impact on that performance characteristic, whereas other modules do not; i.e., as defined earlier, the phrase do not means the other modules have little or no significant impact. For example, the inner module is the primary control of MFD and dispersion. In particular, $\Delta n_{12} = \Delta n_{1-\Delta n2}$ is the principal parameter for controlling MFD and dispersion, but setting $\Delta n_{12}$ in a particular design still allows $\Delta n_1$ and $\Delta n_2$ to be varied provided the difference is constant. On the other hand; the central module is the primary control of bend loss, which, however, is also affected by $\Delta n_2$. Finally, the outer module is the primary control of HOM suppression (loss and cutoff) by resonant coupling. Importantly the control imparted by our design allows our fibers to be concurrently compliant with current G.657.B3 and G.652.D standards.

(Satisfying inequality (1) also impacts the choice of manufacturing processes used to fabricate the individual modules, especially inner module I and outer module II, as discussed infra.)

Figure 5:
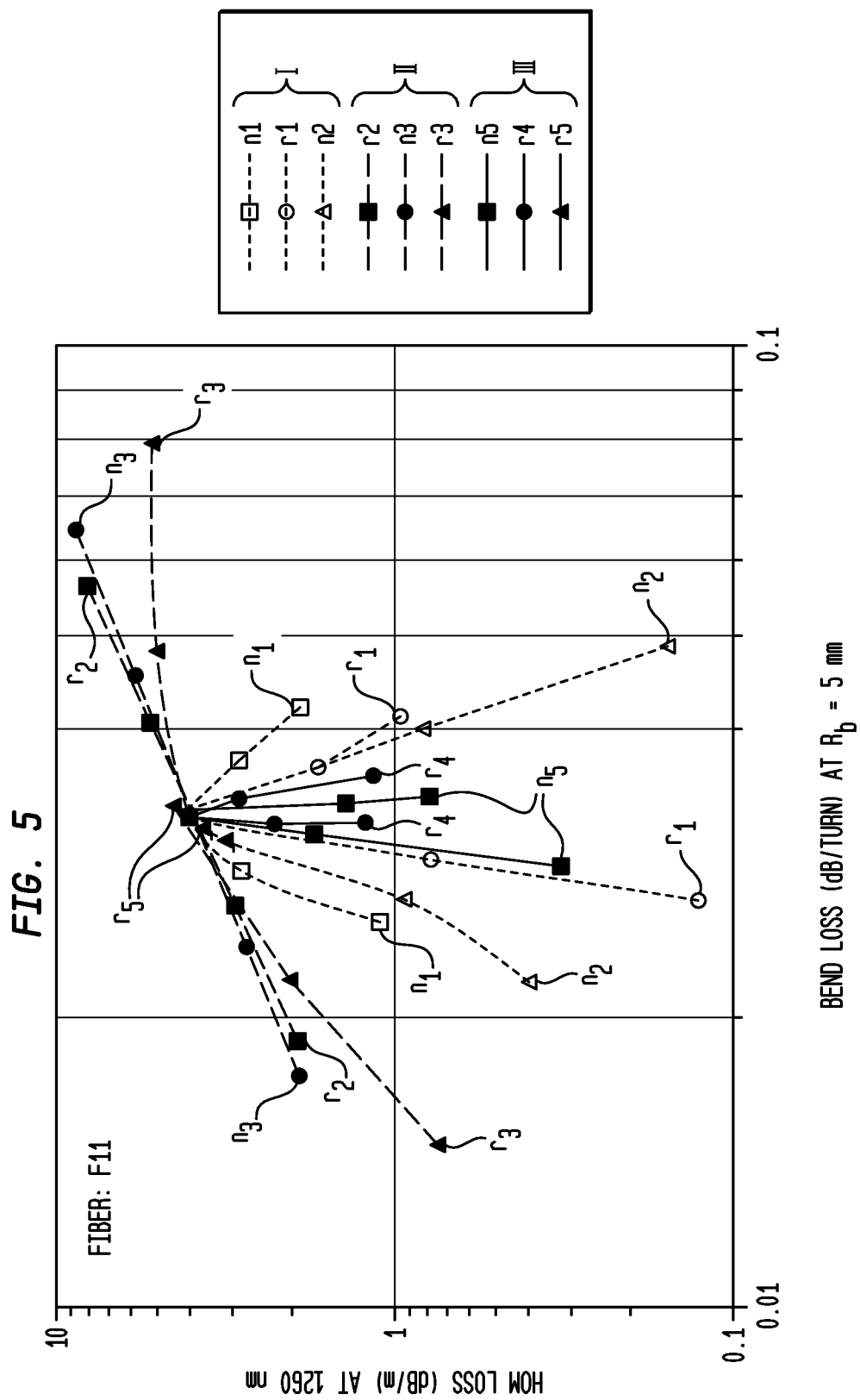
FIG. 5 is a graph of calculated HOM loss vs. bend loss for fiber F11 in accordance with an illustrative embodiment of our invention. Each curve was generated by varying only one of the nine parameters listed in the legend and holding all others constant.

The degree to which various performance characteristics is impacted by the design parameters associated with each of the modules was confirmed by simulations of performance for fiber F11 as follows: HOM loss at 1260 nm vs. bend loss at $R_b=5$ mm (FIG. 5); HOM loss at 1260 nm vs. MFD (FIG. 6); and bend loss vs. MFD at 1310 nm (FIG. 7). In each of these simulations one design parameter (e.g., $n_1$) was varied while all others (e.g., $n_2$, $n_3$, $n_5$, $r_1$, $r_2$, $r_3$, $r_4$, $r_5$) were maintained constant. The range over which each parameter was varied is shown in Tables I and II in the rows labeled "F11 apex," where the row labeled "min" corresponds to the lower end of each range and "max" corresponds to the upper end of each range.

We interpret these curves in the following way:

(1) In FIG. 5, all of the curves, except those for which parameters $r_2$, $r_3$ and $n_3$ were varied, exhibit an apex in HOM loss vs. bend loss, which is caused by resonant coupling between the pedestal region of the outer module III and the core region of the inner module I. However, the curves associated with parameters $r_2$, $r_3$ and $n_3$, which correspond to the deeper inner trench region of the central module II, exhibit no such apex in HOM loss, which is consistent with the fact that the central module II controls bend loss, whereas the inner module I and the outer module II do not. Recall that we define the phrase do not or does not to mean that other modules have little or no affect on a particular performance characteristic.

Figure 6:
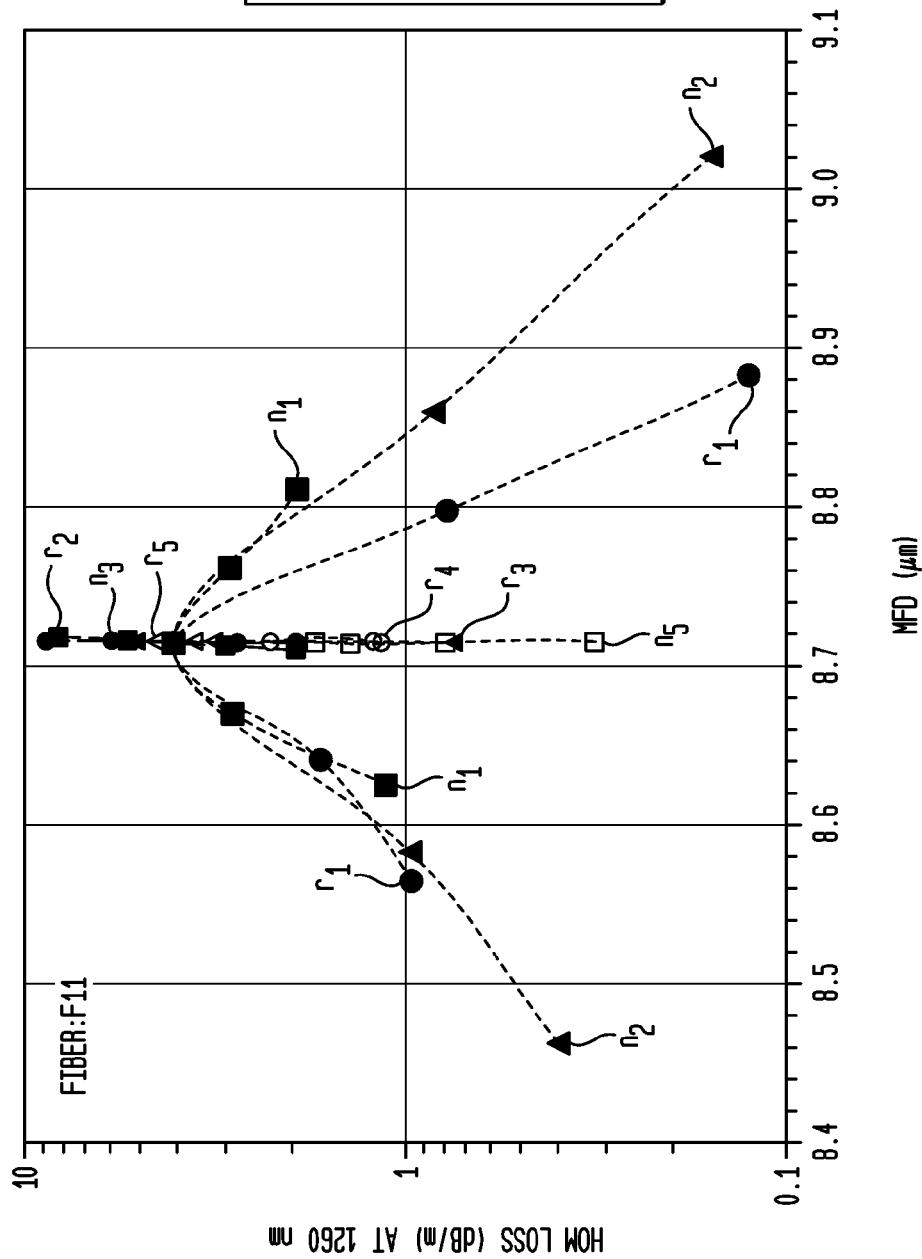
FIG. 6 is a graph of calculated HOM loss at 1260 nm vs. MFD for fiber F11 in accordance with an illustrative embodiment of our invention. Each curve was generated by varying only one of the nine parameters listed in the legend and holding all others constant.
Figure 7:
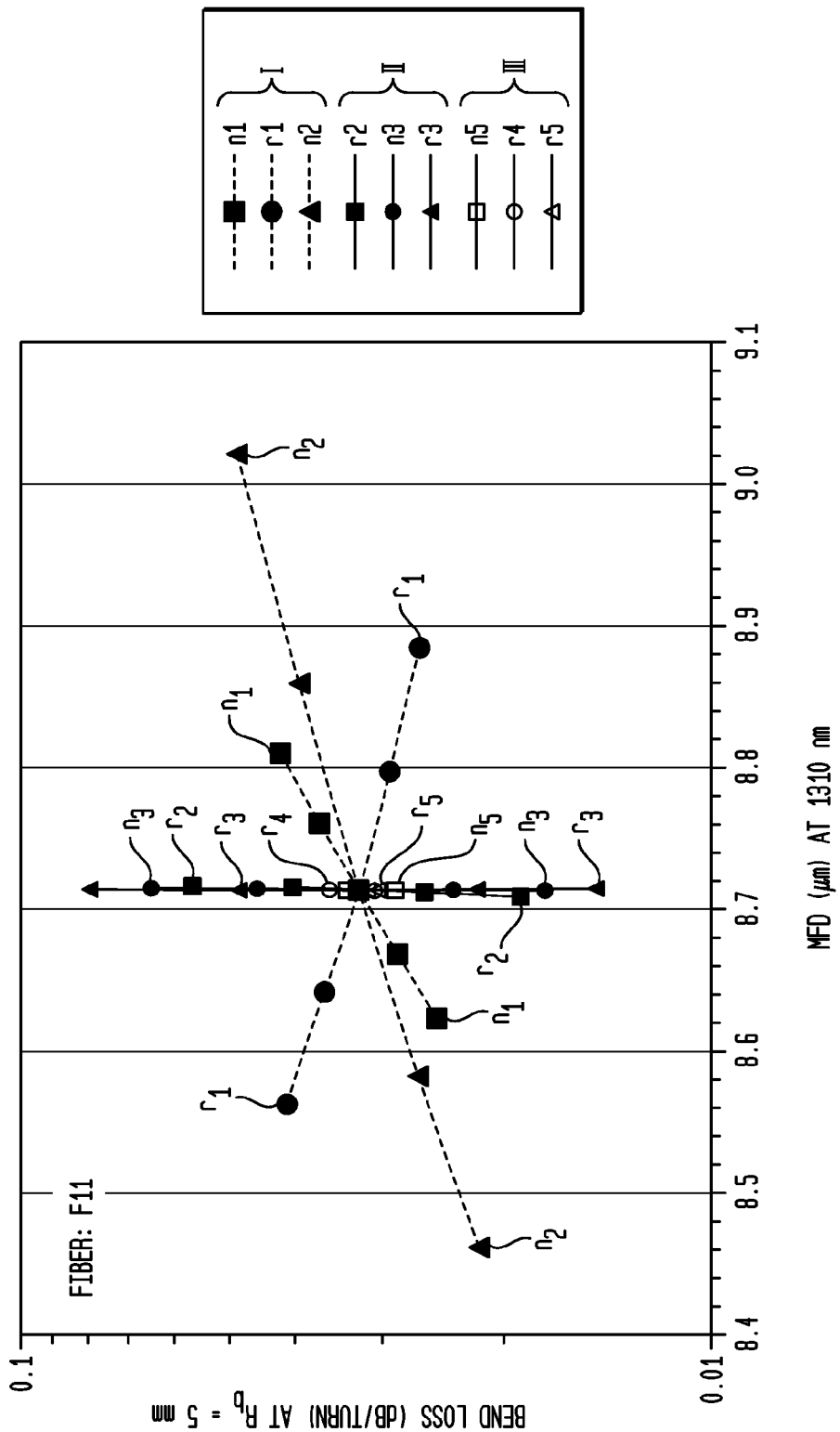
FIG. 7 is a graph of calculated bend loss at $R_b$=5 mm vs. MFD at 1310 nm for fiber F11 in accordance with an illustrative embodiment of our invention. Each curve was generated by varying only one of the nine parameters listed in the legend and holding all others constant.

(2) In FIG. 6, all of the curves, except those for which parameters $r_1$, $n_1$ and $n_2$ were varied, exhibit a fixed MFD of about 8.72 μm, which is consistent with the fact that the inner module I (core and inner cladding regions) controls MFD and that the central module II and outer module III do not. However, the apex in HOM loss for the curves associated with parameters $r_1$, $n_1$ and $n_2$ reflects the resonant coupling between the inner and outer modules.

(3) In FIG. 7, all of the curves, except those for which parameters $r_1$, $n_1$ and $n_2$ were varied, exhibit a fixed MFD of about 8.72 μm, which is consistent with the fact that the inner module I (core and inner cladding regions) controls MFD and that the central module II and outer module III do not. In contrast with FIG. 6, however, no resonant coupling between the inner and outer modules is reflected in FIG. 7 (i.e., there is no apex in the curves), even though resonance is present in the RAF design. Resonance is not reflected because central module II and the inner module I, respectively, control the characteristics plotted, bend loss and MFD, whereas the outer module III (and, therefore, the pedestal region) does not. FIG. 7 also demonstrates that module III has little impact on bend loss; that is, the curves associated with parameters $n_4$, $r_4$, and $n_5$ are clustered in a narrow range around a bend loss of about 0.03 dB/turn, whereas module II has a much larger impact; that is, the curves associated with parameters $r_2$, $n_3$, $r_3$, exhibit a much wider swing from approximately 0.01 to 0.08 dB/turn.

(4) The demonstration of the above desirable modular properties for RAF F11 is illustrative only. We expect that other RAF designs in accordance with our invention (e.g., F1-F10, and F12) would also exhibit similar properties.

TABLE I

RAF Designs - Refractive Index

| | $\Delta n_1 - \Delta n_2$ × $10^{-5}$ | $\Delta n_1$ × $10^{-5}$ | $\Delta n_2$ × $10^{-5}$ | $\Delta n_3$ × $10^{-5}$ | $\Delta n_4$ × $10^{-5}$ | $\Delta n_5$ × $10^{-5}$ |
|---|---|---|---|---|---|---|
| F1 | | 538 | 448 | −90 | −1100 | 0 | −100 |
| F2 | | 538 | 448 | −90 | −1100 | 0 | −110 |
| F3 | | 568 | 448 | −120 | −1200 | 0 | −150 |
| F4 | | 548 | 448 | −100 | −1100 | 0 | −100 |
| F5 | | 568 | 448 | −120 | −1600 | 0 | −120 |
| F6 | | 568 | 448 | −120 | −1400 | 0 | −150 |
| F7 | | 568 | 428 | −140 | −1130 | 0 | −120 |
| F8 | | 568 | 428 | −140 | −1630 | 0 | −120 |
| F9 | | 568 | 428 | −140 | −930 | 0 | −120 |
| F10 | | 560 | 440 | −120 | −1600 | 0 | −80 |
| F11 | | 568 | 448 | −120 | −1200 | 0 | −100 |
| F11 apex | min | 488 | 428 | −60 | −1000 | 0 | −40 |
| | max | 648 | 468 | −180 | −1400 | 0 | −160 |
| F12 | | 538 | 498 | −40 | −950 | 0 | −80 |
| Approximate range | | 488 to 648 | 428 to 498 | −40 to −180 | −930 to −1600 | NA | −40 to −160 |

TABLE II

RAF Designs - Radial Dimensions

| | | $r_1$ | $r_2$ | $r_3$ | $r_4$ | $r_5$ | $t_2 = r_2 - r_1$ | $r_2/r_1$ |
|---|---|---|---|---|---|---|---|---|
| F1 | | 4.15 | 9.00 | 14.25 | 21.0 | 29.65 | 4.85 | 2.2 |
| F2 | | 4.10 | 10.25 | 15.20 | 22.5 | 30.65 | 6.15 | 2.5 |
| F3 | | 4.10 | 12.00 | 16.10 | 23.0 | 30.55 | 7.90 | 2.9 |
| F4 | | 4.10 | 14.35 | 18.65 | 26.3 | 31.55 | 10.25 | 3.5 |
| F5 | | 4.10 | 12.00 | 15.45 | 22.0 | 28.00 | 7.90 | 2.9 |
| F6 | | 4.10 | 12.00 | 15.80 | 23.0 | 29.55 | 7.90 | 2.9 |
| F7 | | 4.10 | 12.45 | 16.45 | 23.0 | 28.00 | 8.35 | 3.0 |
| F8 | | 4.10 | 12.00 | 15.45 | 22.0 | 28.00 | 7.90 | 2.9 |
| F9 | | 4.10 | 14.53 | 18.53 | 25.0 | 30.00 | 10.43 | 3.5 |
| F10 | | 4.10 | 12.00 | 15.45 | 22.0 | 28.00 | 7.90 | 2.9 |
| F11 | | 4.10 | 12.00 | 16.10 | 23.0 | 30.55 | 7.90 | 2.9 |
| F11 apex | min | 3.90 | 11.50 | 15.50 | 22.0 | 29.60 | 7.60 | 2.9 |
| | max | 4.30 | 12.50 | 16.70 | 24.0 | 31.60 | 8.20 | 2.9 |
| F12 | | 4.10 | 10.25 | 14.70 | 29.7 | 33.65 | 6.15 | 2.5 |
| Approximate range | | 3.9 to 4.3 | 9.0 to 14.5 | 14.2 to 18.7 | 21.0 to 29.7 | 28.0 to 33.7 | 4.8 to 10.4 | 2.2 to 3.5 |

RAFs—Performance

The performance of the above RAFs is described below in conjunction with Tables III-V and FIGS. 5-7. In particular, the simulated performance of our RAFs is compared to ITU standards G.657.B3 and G.652.D. Each of twelve RAFs is shown to be concurrently compliant with both standards. Indeed, the simulated performance is so much better that our RAFs could readily meet much stricter requirements that might be adopted by the ITU or specified by a customer in the future.

More specifically, Table III (below) shows the performance of our RAFs with respect to six different characteristics: zero-dispersion-wavelength slope (S0), zero-dispersion wavelength (ZDW), MFD at 1310 nm, MFD at 1550 nm, HOM loss at 1260 nm, and cable cutoff. Simulations demonstrated that our RAFs exceeded the requirements of both standards, where applicable, as follows (where "w/i" is an abbreviation of "within"):

| | | | | |
|---|---|---|---|---|
| S0: | 0.084-0.092 ps/km·nm$^2$ | ≤0.092 ps/km·nm$^2$ | (G.652.D) | (2) |
| ZDW: | 1304-1322 nm | w/i 1300-1324 nm | (G.652.D) | (3) |
| MFD$_{1310}$ | 8.72-8.84 μm | nominal w/i 6.3-9.5 μm | (G.652.B3) | (4) |
| MFD$_{1310}$ | 8.72-8.84 μm | nominal w/i 8.6-9.5 μm | (G.657.D) | (5) |
| cable cutoff | 1210-1260 nm | ≤1260 nm | (G.652.D) | (6) |
| cable cutoff | 1210-1260 nm | ≤1260 nm | (G.657.B3) | (7) |

The two MFD ranges above, 6.3-9.5 μm for G.652.B3 and 8.6-9.5 μm for G.657.D, are labeled "nominal" to indicate that the standard does not treat them as strict limits on manufacturing variability. Rather, it is sufficient that the distribution of MFDs for a particular fiber product be centered within such a range, even though the tails of the distribution might lie outside the range.

On the other hand, Table IV (below) shows the performance of our RAFs at 1550 nm with respect to bend loss and compares each to the requirements of the G.657.B3 standard, where applicable, as follows:

| | | | | |
|---|---|---|---|---|
| $R_b$ = 10 mm | 0.003-0.020 dB/turn | <0.030 dB/turn | (G.657.B3) | (8) |
| $R_b$ = 7.5 mm | 0.008-0.030 dB/turn | <0.080 dB/turn | (G.657.B3) | (9) |
| $R_b$ = 5 mm | 0.022-0.064 dB/turn | <0.150 dB/turn | (G.657.B3) | (10) |

Here, it is significant to point out that at the tighter bend radius of 5 mm our RAFs have lower bend loss by a factor of approximately 2.3-6.8 than the standard's requirement at 1550 nm.

Figure 2:
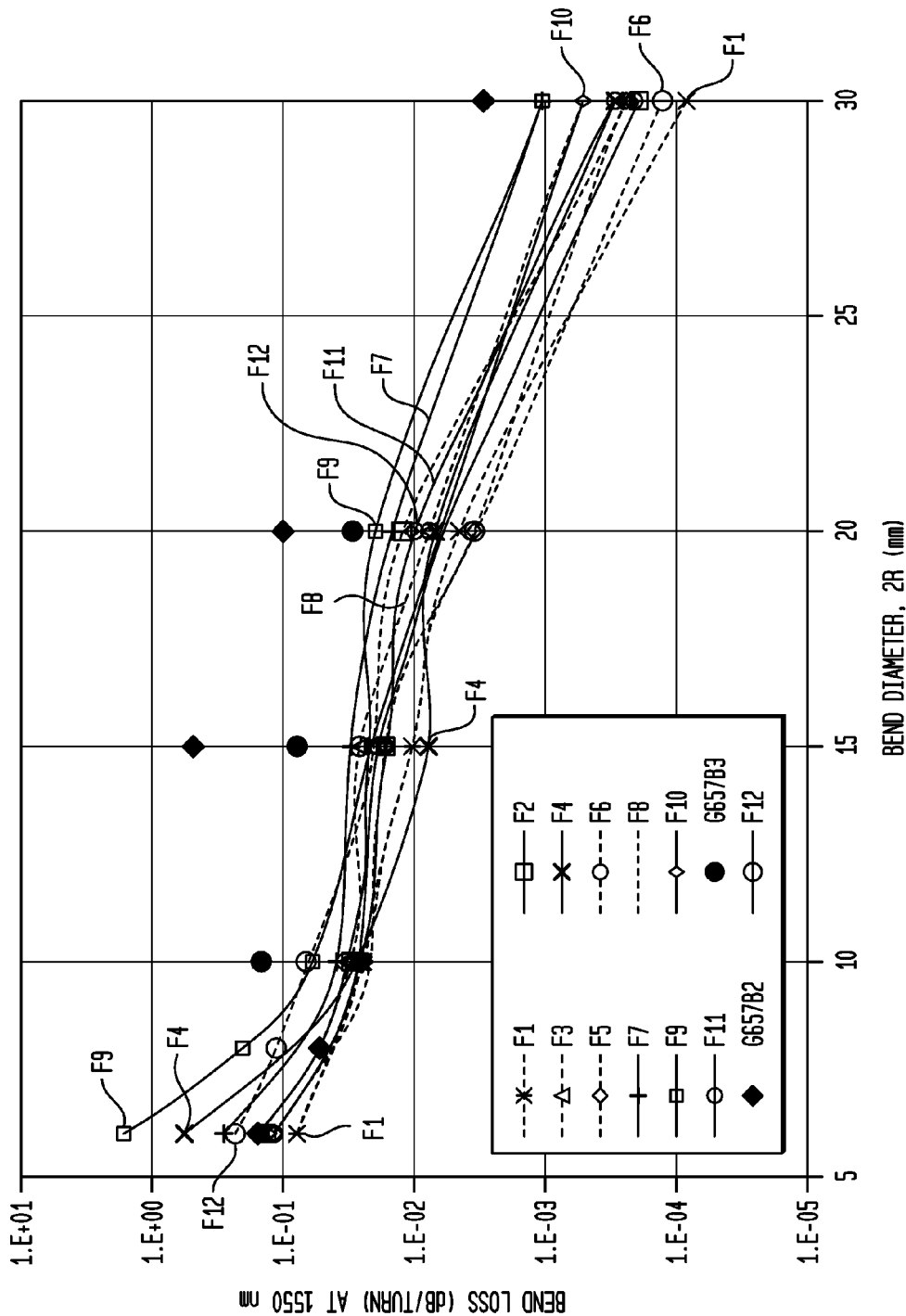
FIG. 2 is a graph of calculated bend loss vs. bend diameter at 1550 nm showing a family of curves, one for each of a multiplicity of different fiber designs (F1-F12) of the type depicted in FIG. 1.

Simulated bend loss vs. bend diameter at 1550 nm is also displayed graphically in FIG. 2 where it is compared to ITU standards G.657.B2 and G.657.B3 for RAFs F1-F12. These plots confirm that the bend loss requirements of these standards are satisfied in each of our RAFs.

Likewise, Table V (below) shows the performance of our RAFs at 1625 nm with respect to bend loss and compares each to the requirements of the G.657.B3 standard, where applicable, as follows:

| | | | | |
|---|---|---|---|---|
| $R_b$ = 10 mm | 0.013-0.050 dB/turn | <0.100 dB/turn | (G.657.B3) | (11) |
| $R_b$ = 7.5 mm | 0.019-0.062 dB/turn | <0.250 dB/turn | (G.657.B3) | (12) |
| $R_b$ = 5 mm | 0.045-0.125 dB/turn | <0.450 dB/turn | (G.657.B3) | (13) |

Figure 3:
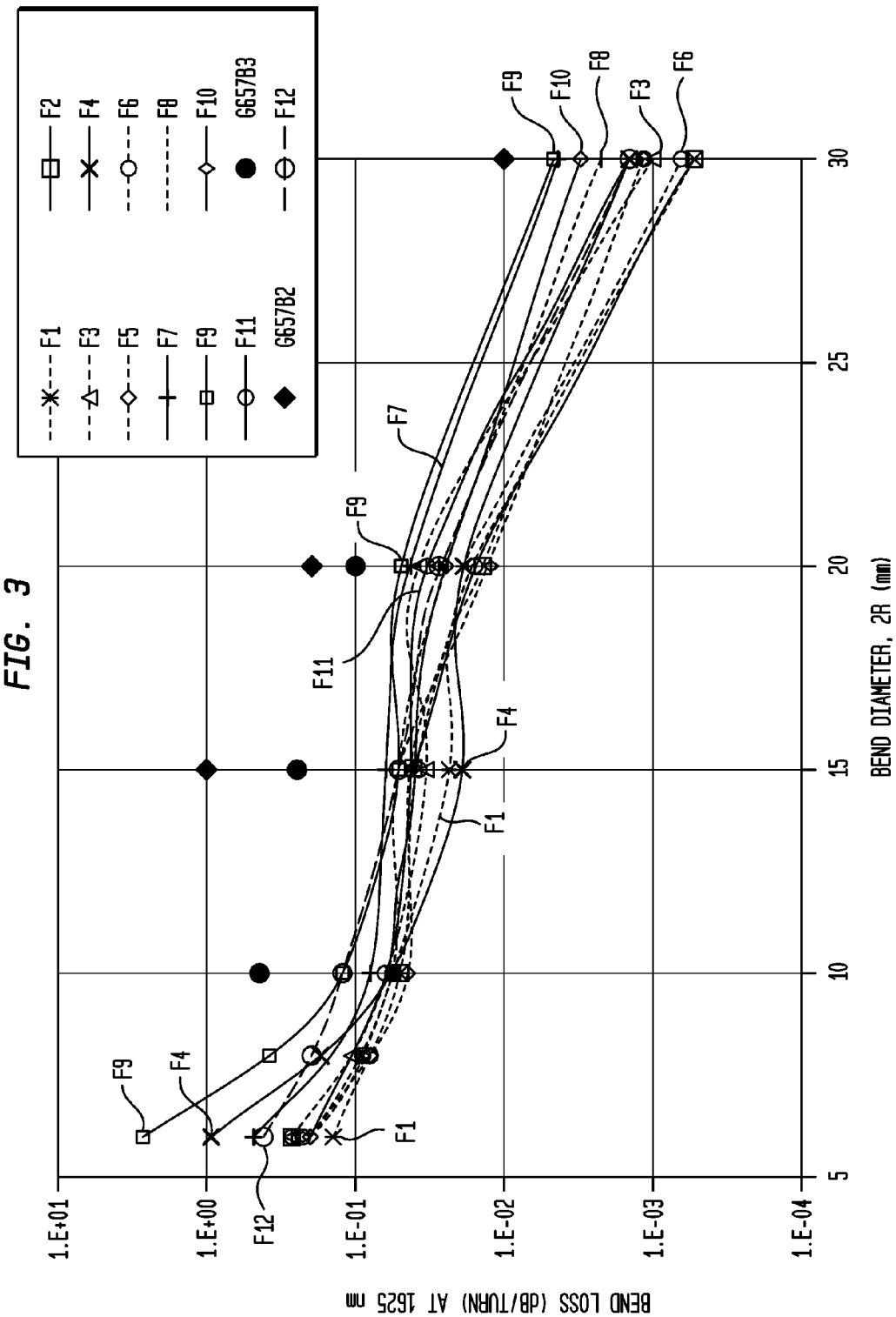
FIG. 3 is a graph of calculated bend loss vs. bend diameter at 1625 nm showing a family of curves, one for each of a multiplicity of different fiber designs (F1-F12) of the type depicted in FIG. 1.

Again, it is significant to point out that at the tighter bend radius of 5 mm our RAFs have lower bend loss by a factor of approximately 3.6-10 than the standard's requirement at 1625 nm Simulated bend loss vs. bend diameter at 1625 nm is also displayed graphically in FIG. 3 where it is compared to ITU standards G.657.B2 and G.657.B3 for RAFs F1-F12. These plots confirm that the requirements of these standards are satisfied in each of our RAFs.

TABLE III

RAF Dispersion, Mode-Field & HOM Performance
Compliance with G.657 & G.652 Standards

| | S0 (ps/km·nm$^2$) | ZDW (nm) | MFD (μm at 1310 nm) | MFD (μm at 1550 nm) | HOM loss (dB at 1260 nm) | Cable Cutoff (nm) |
|---|---|---|---|---|---|---|
| F1 | 0.092 | 1304 | 8.80 | 9.72 | 1.13 | 1260 |
| F2 | 0.089 | 1314 | 8.84 | 9.88 | 2.06 | 1255 |
| F3 | 0.088 | 1317 | 8.72 | 9.80 | 0.57 | 1240 |
| F4 | 0.084 | 1322 | 8.84 | 10.00 | 1.16 | 1260 |
| F5 | 0.088 | 1317 | 8.72 | 9.80 | 1.08 | 1260 |
| F6 | 0.088 | 1317 | 8.72 | 9.80 | 1.19 | 1260 |
| F7 | 0.085 | 1317 | 8.72 | 9.82 | 3.54 | 1210 |
| F8 | 0.086 | 1316 | 8.72 | 9.80 | 2.70 | 1220 |
| F9 | 0.084 | 1319 | 8.72 | 9.86 | 3.92 | 1210 |
| F10 | 0.086 | 1317 | 8.72 | 9.80 | 1.77 | 1240 |
| F11 | 0.086 | 1317 | 8.72 | 9.80 | 4.05 | 1240 |
| F12 | 0.089 | 1315 | 8.84 | 9.90 | 5.32 | 1250 |
| G.657.B3 | NA | NA | 6.3-9.5 | NA | NA | ≤1260 |
| G.652.D | ≤0.092 | 1300-1324 | 8.6-9.5 | NA | NA | ≤1260 |

TABLE IV

RAF Performance - Bend Loss at 1550 nm
Compliance with G.657 Standards
Bend Loss (dB/turn) at 1550 nm

| | $R_b$ = 15 mm | $R_b$ = 10 mm | $R_b$ = 7.5 mm | $R_b$ = 5 mm | $R_b$ = 4 mm | $R_b$ = 3 mm |
|---|---|---|---|---|---|---|
| F1 | 0.0002 | 0.004 | 0.029 | 0.030 | 0.039 | 0.070 |
| F2 | 0.0002 | 0.006 | 0.017 | 0.029 | 0.042 | 0.156 |
| F3 | 0.0001 | 0.004 | 0.020 | 0.029 | 0.055 | 0.100 |
| F4 | 0.0003 | 0.007 | 0.008 | 0.028 | 0.088 | 0.577 |
| F5 | 0.0003 | 0.004 | 0.026 | 0.026 | 0.044 | 0.112 |
| F6 | 0.0001 | 0.003 | 0.021 | 0.022 | 0.046 | 0.119 |
| F7 | 0.0011 | 0.015 | 0.030 | 0.040 | 0.082 | 0.284 |
| F8 | 0.0005 | 0.008 | 0.023 | 0.026 | 0.045 | 0.111 |
| F9 | 0.0011 | 0.020 | 0.023 | 0.059 | 0.203 | 1.654 |

TABLE IV-continued

RAF Performance - Bend Loss at 1550 nm
Compliance with G.657 Standards
Bend Loss (dB/turn) at 1550 nm

| | $R_b=$ 15 mm | $R_b=$ 10 mm | $R_b=$ 7.5 mm | $R_b=$ 5 mm | $R_b=$ 4 mm | $R_b=$ 3 mm |
|---|---|---|---|---|---|---|
| F10 | 0.0005 | 0.006 | 0.019 | 0.027 | 0.046 | 0.124 |
| F11 | 0.0003 | 0.010 | 0.017 | 0.033 | 0.056 | 0.160 |
| F12 | 0.0002 | 0.012 | 0.021 | 0.064 | 0.113 | 0.246 |
| G.657.B3 | NA | <0.030 | <0.080 | <0.150 | NA | NA |

TABLE V

RAF Performance - Bend Loss at 1625 nm
Compliance with G.657 Standards
Bend Loss (dB/turn) at 1625 nm

| | $R_b=$ 15 mm | $R_b=$ 10 mm | $R_b=$ 7.5 mm | $R_b=$ 5 mm | $R_b=$ 4 mm | $R_b=$ 3 mm |
|---|---|---|---|---|---|---|
| F1 | 0.0007 | 0.015 | 0.046 | 0.058 | 0.074 | 0.120 |
| F2 | 0.0005 | 0.016 | 0.041 | 0.059 | 0.107 | 0.264 |
| F3 | 0.0007 | 0.025 | 0.035 | 0.056 | 0.080 | 0.168 |
| F4 | 0.0014 | 0.018 | 0.019 | 0.058 | 0.174 | 0.951 |
| F5 | 0.0011 | 0.013 | 0.051 | 0.052 | 0.082 | 0.197 |
| F6 | 0.0006 | 0.014 | 0.039 | 0.045 | 0.088 | 0.208 |
| F7 | 0.0043 | 0.043 | 0.062 | 0.082 | 0.153 | 0.490 |
| F8 | 0.0022 | 0.025 | 0.046 | 0.052 | 0.084 | 0.196 |
| F9 | 0.0045 | 0.050 | 0.053 | 0.124 | 0.387 | 2.722 |
| F10 | 0.0029 | 0.024 | 0.042 | 0.058 | 0.094 | 0.215 |
| F11 | 0.0014 | 0.033 | 0.036 | 0.065 | 0.108 | 0.273 |
| F12 | 0.0014 | 0.027 | 0.047 | 0.125 | 0.199 | 0.419 |
| G.657.B3 | NA | <0.100 | <0.250 | <0.450 | NA | NA |

In addition to demonstrating that our fibers satisfy ITU bend loss standards at $R_b=10$ mm, 7.5 mm and 5 mm, Table V also demonstrates that our fibers also exhibit relatively low bend loss at tighter bend radii of 3 mm and 4 mm Although, there are no current standards for such tighter bend radii, we expect that customers planning access fiber applications that involve the use of such tighter bends will find our fiber designs attractive.

Finally, we investigated HOM suppression. The simulated results are plotted as HOM loss vs. wavelength in FIG. 4. To some degree each RAF exhibits resonant coupling between an unwanted core region mode ($LP_{11}$ in this case) and a ring mode of the pedestal region. RAFs exhibiting higher, sharper apexes (e.g., RAF F2) have stronger resonant coupling that those with lower, flatter apexes (e.g., F8). However, even those RAFs where there is no apex (i.e., no inflection point) have some resonant coupling (e.g., RAF F4).

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

RAFs—Applications

Figure 8:
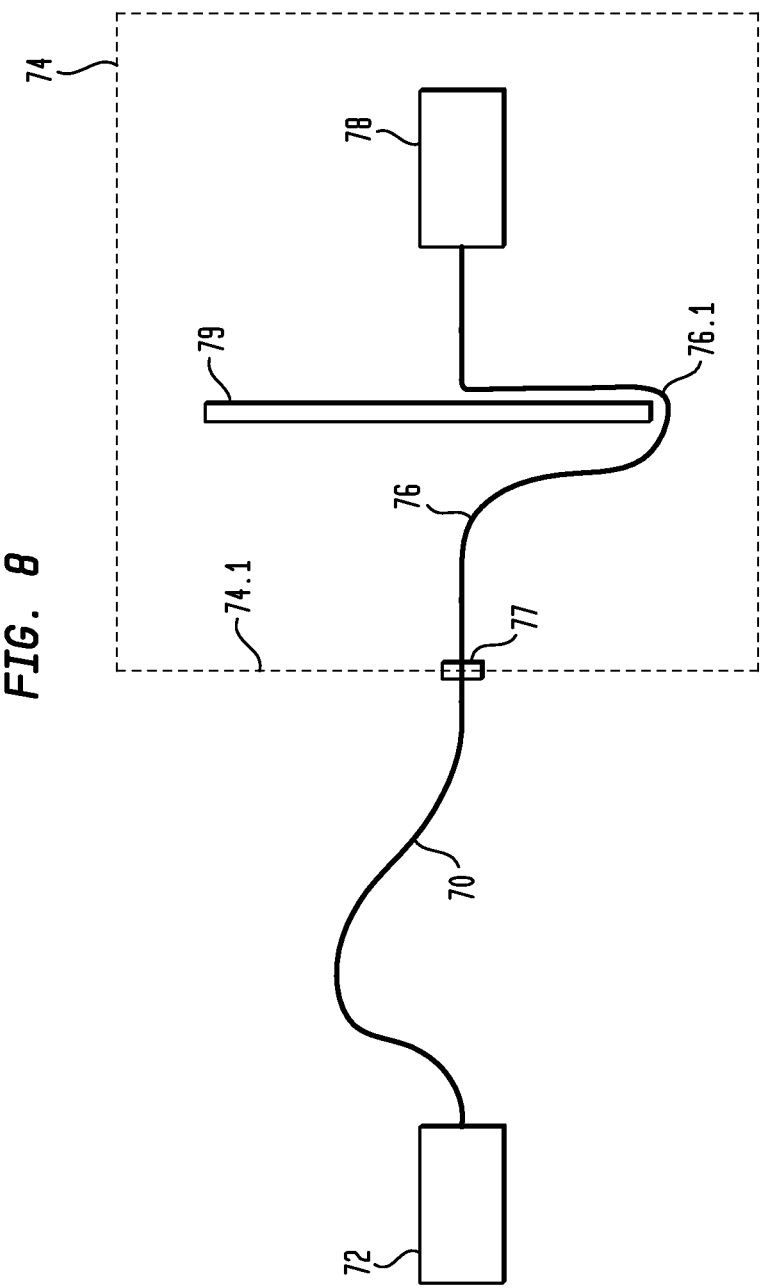
FIG. 8 is a schematic block diagram depicting an illustrative access application of our optical fiber.

An illustrative, highly generalized application of our access and/or FTTH fibers is shown in FIG. 8. Here, an input fiber (e.g., a standard SMF 70) carries an optical signal from a source 72 (e.g., a transmission system) to a facility 74 (e.g., a building housing a business or home). Illustratively, SMF 70 is spliced to an access fiber 76, a RAF in accordance with our invention. Fiber 76 carries the signal to a utilization device or apparatus 78 located within or associated with the facility. SMF 70 and access fiber 76 are illustratively spliced to one another at a connection box 77, which is typically located on an interior or exterior wall 74.1 of facility 74. However, the connection box could be located elsewhere within the facility or outside it. In either case, access fiber 76 typically does not have a straight line path to utilization apparatus 78. Rather, it often has to navigate around one or more obstacles 79, which means that it frequently has at least one curved segment or section 76.1. As described previously, such curved sections may have tight bends in which the fiber bend radius is 3-15 mm, approximately. The mode-matching features of our access fibers permit them to be efficiently spliced to SMF and at the same to be bent around obstacles without experiencing excessive bend loss. Alternatively, SMF 70 may be an output fiber or both an input and an output fiber. Therefore, in general SMF 70 may be referred to as an input/output fiber.

Of course, those skilled in the art will readily recognize that the curved segment or section 76.1 could also be located outside the facility 74.

Finally, although we have emphasized the use of our fibers in access applications, it will also be apparent to those skilled in the art that the reduced bend sensitivity of these fibers renders them attractive for use in, for example, sensors or vehicles (e.g., automobiles, airplanes, trains, boats). In addition, rolled-up or coiled-up versions of our RAFs may be found in housings that serve to retain the fiber in applications where the housing may, for example, be part of an optical amplifier package or simply a storage box.

RAFs—Fabrication Considerations

Modular fibers designed in accordance with our invention have improved manufacturability in that the separate modules may be produced using a variety of techniques other than low-deposition-rate techniques such as MCVD, thereby leading to the possibility of lower cost solutions.

Accordingly, another aspect of our invention is a method of making the above-described RAFs (or preforms from which fibers can be drawn) comprising the steps of:

(a) fabricating the inner module I (core and inner cladding regions) by a technique selected from the group consisting of vapor-phase axial deposition (VAD), outside vapor deposition (OVD) and plasma-assisted chemical vapor deposition (PCVD) of doped silica glass;

(b) fabricating the central module II (inner trench region) of low index silica glass by a technique selected from the group consisting of plasma outside deposition (POD), PCVD, high-pressure sintering of deposited soot, an F-doped sol-gel overcladding process, and a void-filled glass process; and (c) fabricating the outer module III (outer trench region and outer cladding region) of silica glass by a process that includes collapsing silica tubes—a down-doped silica tube for the outer trench region and an undoped silica tube for the outer cladding region.

After the preform is fabricated, standard drawing techniques may be used to draw optical fiber from the preform.

Techniques in accordance with illustrative embodiments of our invention for fabricating each of the modules of the above-described RAFs (or preforms) of silica glass include those listed in Table VI below.

TABLE VI

Fabrication Techniques

| Method | Module I Core region | Module I Inner cladding region | Module II Inner trench region | Module III Pedestal region | Module III Outer trench region | Module III Outer cladding region |
|---|---|---|---|---|---|---|
| 1 | VAD or OVD | VAD or OVD | POD | silica tube | down-doped silica tube | Silica cylinder |
| 2 | VAD or OVD | VAD or OVD | PCVD | PCVD | down-doped silica tube | Silica cylinder |
| 3 | VAD or OVD | VAD or OVD | High pressure Sintering | silica tube | down-doped silica tube | Silica cylinder |
| 4 | VAD or OVD | VAD or OVD | Sol-gel tube over-cladding | silica tube | down-doped silica tube | Silica cylinder |
| 5 | VAD or OVD | VAD or OVD | Void-filled glass | silica tube | down-doped silica tube | Silica cylinder |
| 6 | PCVD | PCVD | PCVD | PCVD | down-doped silica tube | Silica cylinder |

The process of Method 2 entails collapsing a hollow tube made by PCVD, comprising the inner trench region and the pedestal region, onto the core rod made by VAD or OVD. (Note, as used herein, the terms core rod and core preform are equivalent, and in each case the term core is meant to include the regions of the inner module; that is, the core region 14.1 plus the inner cladding region 14.2.) PCVD occurs inside a substrate tube, yielding an annular body which is subsequently collapsed. In Method 6, PCVD is used to deposit the four innermost regions (core region, inner cladding region, inner trench region, and pedestal region) inside a substrate tube and collapsing this annular body into a single glass rod. The substrate tube used for PCVD could either be pure silica and form the pedestal region or be an F-doped tube and form the outer trench region. Methods 1, 3, 4, and 5 involve making a core rod comprising the core region and inner cladding region with VAD or OVD, then adding the heavily F-doped inner trench region to the outside of that glass body by a different method. POD in Method 1 involves directly depositing heavily F-doped glass in a molten state using a plasma torch as heat source. With high pressure sintering in Method 3, $SiO_2$ soot is deposited on the core rod by VAD and sintered in a fluorine atmosphere. Method 4 represents making a deeply F-doped tube with a sol-gel glass-making process and then collapsing it around the core rod. Method 5 represents adding void-filled glass onto the surface of the core rod.

Both silica tubes and silica cylinders are products well known in art. Typically, a tube is drawn from a cylinder. Cylinders and tubes may be either un-doped, incorporate a dopant such as F that depresses the refractive index, or incorporate a dopant such as $GeO_2$ that increases the refractive index. For example, in Table VI the silica tubes used to form the pedestal region of Methods 1 and 3-5 and the silica cylinders used to form the outer cladding regions of Methods 1-6 are illustratively undoped, whereas the silica tubes used to form the outer trench are typically down-doped (usually with F).

For each of the methods above, well-known plasma or furnace stretching/squeezing of Modules I and II to locally correct the core diameter and well-known etching the outside wall of the pedestal, both to improve precision of resonant control, might be implemented. More specifically, after a core preform is made, the performance parameters (MFD, ZDW, zero-dispersion-slope, resonance, etc.) at each longitudinal position can be calculated based on preform index profile scan data. If significant longitudinal variation of the core parameters exists, the core rod can be locally corrected by local plasma or furnace heating. The core rod is either stretched or squeezed slightly based on calculation. On the other hand, etching the outside wall of the pedestal region 14.4 means uniform, radial etching (e.g., with an HF solution) at a position corresponding to radius $r_4$, the outer radius of the pedestal region 14.4.

These two processing steps are related to the apexes (resonance) shown in FIGS. 5-7 Both the core region parameters ($r_1$, $n_1$, $r_2$) and pedestal region parameters ($r_4$, $n_4$) impact resonance. The typical tuning range of the core parameters (especially $r_1$) is less than that of the pedestal region (i.e., $r_4$); for example, adjusting $r_1$ by 0.4 μm has a similar impact on resonance as adjusting $r_4$ by 2 μm.

Each of the individual sub-process employed in the fabrication of our RAFs (or RAF preforms) of silica glass is well-known to those skilled in the art, although the unique combinations of those processes described above is enabled by the equally unique design of our RAFs. For example, when the deep inner trench region 14.3 is sufficiently far from the core region (i.e., $2.5 \sim r_2/r_1 \sim 3.5$), so that fundamental mode intensity is low therein, then the inner trench need not be made by a process that produces very high purity glass, such as MCVD or PCVD, because the optical loss will be relatively low. More specifically, it can be made by a process that produces less pure glass, such as POD, void-filled glass or a sol-gel process. The sol-gel process can make deeply F-doped tubes which can be collapsed onto the core rod. These lower purity processes will usually be more cost-effective, often by allowing the production of larger glass bodies. On the other hand, when the inner trench is relatively closer to the core region (i.e., $2.2 \sim r_2/r_1 \sim 2.5$), then the fundamental mode intensity within the inner trench region will be higher and the optical loss will be concomitantly higher. Under these circumstances, it is preferable that the inner trench region is formed by a process that produces high purity glass, such as high pressure sintering of deposited soot or PCVD.

Illustrative prior art references describing each sub-process, as well as illustrative commercial sources of silica tubes/cylinders, are listed below and are incorporated herein by reference:

1) VAD: (i) J. B. MacChesney et al., "Overview of Materials and Fabrication Technologies," Ch. 3, pp. 69-94, Ch. 3.4 "Vertical Axial Deposition," *Specialty Fiber Handbook*, A. Mendezand et al., Ed., Academic Press (2007); (ii) J. J. Refi, *Fiber Optic Cable—A Light Guide*, abc Teletraining Inc. (1991), pp. 67-68; and (iii) F. Fontaine, "Vapor Deposition," pp. 1-6, available on the internet on Oct. 29, 2009 at website URL www.cooper.edu/engineering/projects/gateway/ee/solidmat/modlec5/node2.html;

2) OVD: (i) A. J. Morrow et al., "Outside Vapor Deposition," in *Optical Fiber Communications, Volume* 1: *Fiber Fabrication*, Ch. 2, pp. 1-33, T. Li, ed. Academic Press, Inc. (Orlando, 1985); and (ii) F. Fontaine, ibid;

3) POD: G. F. Schotz et al., "New Silica Fiber for Broad-Band Spectroscopy," *Fiber Optics in Astronomy III, ASP Conference Series*, Vol. 152, pp. 20-31 (1998);

4) PCVD: (i) MacChesney, ibid, Ch. 3.7, "Plasma Chemical Vapor Deposition;" (ii) Fontaine, ibid;

5) High pressure sintering of deposited soot: M. Kyoto et al., U.S. Pat. No. 5,053,068 (1991);

6) F-doped sol-gel tube process: MacChesney, ibid, Ch. 3.8, "Sol-Gel Processes;"

7) Void-filled glass process: D. C. Bookbinder et al., US Patent Application Publication No. 2007/0104437 (May 2007);

8) Undoped silica tube: "F300" silica tubes commercially available from Heraeus Quarzglas GmbH, Hanau, Germany.

9) Down-doped silica tube: "F320" F-doped silica tube commercially available from Heraeus Quarzglas GmbH, Hanau, Germany; and 10) Silica cylinder: RIC® cylinder commercially available from Heraeus Quarzglas GmbH, Hanau, Germany."

We claim:

1. A method of fabricating a silica optical fiber or fiber preform comprising the steps of:
forming a first module including a core region and an inner cladding region,
forming a second module, surrounding said first module, said second module including an inner trench region, and
forming a third module surrounding said second module, said third module including a pedestal region surrounding said inner trench region, an outer trench region surrounding said pedestal region, and an outer cladding region surrounding said outer trench region,
wherein said modules are formed so that said outer cladding region has a refractive index less than that of said core region, said inner cladding region has a refractive index less than that of said outer cladding region, said pedestal region has a refractive index approximately equal to that of said outer cladding region, said inner trench region has a refractive index much less than that of said outer cladding region, said pedestal region has a refractive index greater than the refractive indices of said inner and outer trench regions, and said pedestal region is configured to resonantly couple at least one transverse mode of said core region, other than said fundamental mode, to at least one transverse mode of said pedestal region, said core region of said fiber has a radius of $r_1$, said inner trench region of said fiber has an inside radius of $r_2$, the ratio $r_2/r_1 \sim 2.0\text{-}3.5$, and wherein
said first module is fabricated by a process selected from the group consisting of vapor phase axial deposition (VAD), outside vapor deposition (OVD) and plasma chemical vapor deposition (PCVD),
said second module is fabricated by a process selected from the group consisting of plasma outside deposition (POD), PCVD, high pressure sintering of deposited soot, a down-doped sol-gel tube overcladding process, and a void-containing silica process, and
said third module is fabricated by forming said pedestal region from a silica tube or by PCVD, forming said outer trench region from a down-doped silica tube, and forming said outer cladding region from a silica cylinder.

2. The method of claim 1, wherein
said first module is formed by VAD or OVD, said second module is formed by POD, and said pedestal region is formed from a silica tube.

3. The method of claim 1, wherein
said first module is formed by VAD or OVD, said second module is formed by PCVD.

4. The method of claim 1, wherein
said inner module is formed so that $r_2/r_1 > 2.5$, and
said first module is formed by VAD or OVD, said inner trench region is formed by high pressure sintering of deposited soot and said pedestal region is formed from a silica tube.

5. The method of claim 1, wherein
said inner module is formed so that $r_2/r_1 > 2.5$, and
said first module is formed by VAD or OVD, said inner trench region is formed by a down-doped sol-gel tube overcladding process, and said pedestal region is formed from a silica tube.

6. The method of claim 1, wherein
said inner module is formed so that $r_2/r_1 > 2.5$, and
said first module is formed by VAD or OVD, said inner trench region is formed by a void-filled glass process, and said pedestal region is formed from a silica tube.

7. The method of claim 1, wherein
said first module and said second module are formed by PCVD.

8. The method of claim 1, wherein said method produces a preform, and further including the step of drawing an optical fiber from said preform.

9. The method of claim 1, wherein said pedestal region is formed from an undoped silica tube.

10. The method of claim 1, wherein said outer trench is formed from an F-doped silica tube.

11. A method of fabricating an optical fiber or fiber preform, comprising the steps of:
forming a first module including a core region and an inner cladding region,
forming a second module, surrounding said first module, said second module including an inner trench region, and
forming a third module surrounding said second module, said third module including a pedestal region surrounding said inner trench region, an outer trench region surrounding said pedestal region, and an outer cladding region surrounding said outer trench region,
wherein said modules are formed so that said outer cladding region has a refractive index less than that of said core region, said inner cladding region has a refractive index less than that of said outer cladding region, said pedestal region has a refractive index approximately equal to that of said outer cladding region, said inner trench region has a refractive index much less than that of said outer cladding region, said pedestal region has a refractive index greater than the refractive indices of said inner and outer trench regions, and said pedestal region is configured to resonantly couple at least one transverse mode of said core region, other than said fundamental mode, to at least one transverse mode of said pedestal region
wherein said first module is fabricated by a process selected from the group consisting of vapor phase axial deposition, outside vapor-phase deposition and plasma chemical vapor deposition,
said second module is fabricated by a process selected from the group consisting of plasma outside deposition, phase chemical vapor deposition, high pressure sintering of deposited soot, a down-doped sol-gel tube overcladding process, and void-containing silica process, and
said third module is fabricated by forming said pedestal region from a silica tube or by plasma chemical vapor deposition, forming said outer trench from a down-doped silica tube, and forming said outer cladding region from a silica cylinder.

12. The method of claim 11, wherein said pedestal is formed from an undoped silica tube.

13. The method of claim 11, wherein said outer trench region is formed from an F-doped silica tube.

14. The method of claim 11, wherein said method produces a preform, and further including the step of drawing an optical fiber from said preform.

* * * * *